United States Patent
Heutz et al.

(10) Patent No.: US 12,422,382 B2
(45) Date of Patent: Sep. 23, 2025

(54) METHOD AND DEVICE FOR THE CONTACTLESS DETERMINATION OF AT LEAST ONE PROPERTY OF AN AT LEAST PARTIALLY MELTED ENDLESS STRAND

(71) Applicant: MECORAD GMBH, Cologne (DE)

(72) Inventors: Andreas Heutz, Bornheim (DE);
Cagdas Cunhur Ünlüer, Essen (DE);
Marc Banaszak, Düsseldorf (DE)

(73) Assignee: MECORAD GMBH, Cologne (DE)

( * ) Notice: Subject to any disclaimer, the term of this patent is extended or adjusted under 35 U.S.C. 154(b) by 0 days.

(21) Appl. No.: 18/009,457

(22) PCT Filed: Jun. 11, 2021

(86) PCT No.: PCT/EP2021/065872
§ 371 (c)(1),
(2) Date: Dec. 9, 2022

(87) PCT Pub. No.: WO2021/250271
PCT Pub. Date: Dec. 16, 2021

(65) Prior Publication Data
US 2023/0236137 A1 Jul. 27, 2023

(30) Foreign Application Priority Data
Jun. 11, 2020 (EP) .................................. 20179440

(51) Int. Cl.
*B22D 11/16* (2006.01)
*G01N 22/02* (2006.01)

(52) U.S. Cl.
CPC ........... *G01N 22/02* (2013.01); *B22D 11/163* (2013.01)

(58) Field of Classification Search
CPC ..... B22D 11/163; B22D 11/16; B22D 11/168; B22D 11/18; B22D 11/181;
(Continued)

(56) References Cited

FOREIGN PATENT DOCUMENTS

EP 3628416 A1 * 4/2020 ........... B22D 11/142

OTHER PUBLICATIONS

English machine translation of EP3628416A1 (Year: 2020).*

* cited by examiner

*Primary Examiner* — Kevin P Kerns
*Assistant Examiner* — Steven S Ha
(74) *Attorney, Agent, or Firm* — Hemisphere Law, PLLC; Zhigang Ma (57) ABSTRACT

The present invention relates to a method for contactless determination of at least one property of an at least partially melted quasi-endless strand during a casting process of the quasi-endless strand, which cools down within a cooling zone, allowing successive hardening of the quasi-endless strand, comprising at least the following steps: Emitting a first signal, in particular a first radar signal, in the form of radiation by an emission device, in particular a radar emission device, Generating a second signal, in particular a second radar signal, at least partly by an interaction of the first signal with a region of the quasi-endless strand, receiving the second signal by a reception device, in particular by a reception device for radar signals, determining at least one property of the quasi-endless strand on the basis of the second signal, wherein at least the step of interacting takes place within the cooling zone or upstream of the cooling zone (K), in particular immediately after exit from a mold. The present invention further relates to a device for casting a material, in particular a metal, into a quasi-endless strand in the context of a continuous casting process and for contactless determination of at least one property of the at least partially molten quasi-endless strand during casting of the quasi-endless strand, comprising a mold adapted to form said quasi-endless strand, a cooling zone in which said quasi-endless strand cools down, whereby successive hardening of said quasi-endless strand is enabled, an emission (Continued)

device, in particular a radar transmitter, adapted to emit emitting a first signal in the form of radiation, in particular as a first radar signal, a reception device, in particular a radar receiver, which is arranged to receive a second signal, in particular a second radar signal, whereby the second signal being generated at least partially by interaction of the first signal with a region of the quasi-endless strand within in the cooling zone or upstream of the cooling zone (K), in particular immediately after exit from a mold, a data processing unit arranged to determine at least one property of the quasi-endless strand on the basis of the second signal. According to the invention, a corresponding use is also provided.

11 Claims, 5 Drawing Sheets

(58) Field of Classification Search
CPC ........ B22D 11/185–187; B22D 11/188; B22D 11/20; B22D 11/201; B22D 11/204; B22D 11/205; B22D 11/206; B22D 11/207
See application file for complete search history.

METHOD AND DEVICE FOR THE CONTACTLESS DETERMINATION OF AT LEAST ONE PROPERTY OF AN AT LEAST PARTIALLY MELTED ENDLESS STRAND

TECHNICAL FIELD

The present invention relates to a method for contactless determination of at least one property of an at least partially melted quasi-endless strand during a casting operation of the quasi-endless strand, which cools in a cooling zone.

STATE OF THE ART

Casting of metals and alloys is a manufacturing process in which individually shaped workpieces (castings) are produced from molten metal (e.g. molten steel). There are numerous different casting processes, which can be classified according to several criteria.

Casting in molds that largely correspond to the shape of the finished part is the mold casting process that is most commonly used. In addition, there is casting into theoretically endless strands, called continuous casting.

Continuous casting or continuous cast in this context refers to an endless process used for both discontinuous and continuous production of continuous cast products (e.g. (rolled) ingots and extrusion billets, also known as blanks) from ferrous and non-ferrous alloys. In the steel mill, the term (rolled) slab is also commonly used.

The technology of continuous casting differs only slightly, regardless of whether steels, copper alloys or aluminum are being processed. The main difference lies in the temperatures, which range from around 700° C. for pure or alloyed aluminum to 1,400° C. or 1,550° C. for steel.

Depending on the mold arrangement, a distinction is made between horizontal and vertical continuous casting, the former being used specifically for copper alloys and small-format strands.

In the field of vertical systems, vertical, vertical bending and arc (in particular progressive bending and circular arc) systems are known to those skilled in the art. After leaving the mold in the cooling zone (K), the strand is guided by a supporting strand guide (e.g. a support roller frame), which can be arranged vertically or on an arc segment. In this zone (also called bending zone), especially in the case of vertical bending and arc systems, the core of the strand is liquid and hardens as it progresses through the cooling zone (K). In vertical bending and arc systems, the strand is straightened by means of a straightener after reaching the horizontal.

In a continuous caster, the temperature of the cast strand obtained drops during solidification at each cross-sectional position of the cast strand during production from the analysis-dependent casting temperature of approx. 1,550° C. to below 900° C., and in some cases to below 700° C. The ductility of the steel material used, which represents an evaluation criterion for the weakening of the material, exhibits local minima in this temperature interval. When carrying out the casting process, therefore, particular importance is attached to the temperature control, which is selected and set so, that in the crack-critical bending and straightening areas of a continuous caster, the ductility during production of the cast strand is high enough to prevent cracking.

In the continuous casting of slabs (rolled slabs and extrusion billets made of steel), the molten steel is poured into copper molds which are open at the bottom and water-cooled. The steel emerges through this opening in the outer areas in solidified form and is continuously drawn off as an endless strand via guide and drive rolls. On its way from the vertical to the horizontal position more than 15 meters below, the steel strand also cools down on the inside. It is continuously sprayed with water for this purpose and has a relatively tough and strong structure due to the rapid cooling.

Continuous cast products are also referred to as semi-finished products because they have to undergo further processing operations before they become final products. Rolling, pressing and deep drawing are used in most cases, in conjunction with a preceding time-limited aging at room or ambient temperature, or an upstream or downstream thermal treatment (tempering and aging).

Various methods for determining properties, in particular disturbances during casting operation, are known from the state of the art.

In particular, radiometric measuring systems, ultrasonic measuring systems, radar measuring systems, optical measuring systems (laser, camera) and/or force measuring systems are used to determine properties. In some settings, X-ray or isotope solutions are used in the steel industry for accurate measurement. However, these technologies emit radiation and are costly to maintain.

Ultrasonic measurement systems and optical measurement systems have the disadvantage that difficult conditions in the steel industry, such as thermal radiation, evaporated water from cooling and dust hinder measurement with sensors in many positions where it would be beneficial to obtain geometric information about the production goods. A comparison of sensor technologies shows that ultrasonic or optical sensors (laser, camera) are very negatively affected by the media in the atmosphere of a steel mill. Thus, none of the aforementioned measurement systems is able to cope with all these interfering factors at the same time while reproducing the high-precision values of a laboratory situation.

Radar can measure through all of these zones. Despite the fact that at first glance radar technology appears to be less accurate than a laser in a laboratory situation, radar maintains its precision in the real atmosphere of a steel mill. Radar sensors generally emit an electromagnetic wave based on technology similar to a cell phone. The radiation is many times, preferably 1000 times, lower than that of a normal cell phone.

A particular challenge in such measurement arrangements is the positioning of the measurement device. The high temperatures of the strand before it passes through the cooling zone make measurements in this area difficult and expose the measuring device to negative influences, especially high temperatures and thermal radiation, which can impair its functionality.

For example, DE 10 2018 108 696 A1 describes an optical measuring method for contactless determination of the dimension of a moving material web.

A process for continuous casting of steel in a casting mold is known from WO 96/36449. In this process, liquified steel and synthetic slag are transferred through tubes into the casting mold, the tubes extending through a heat-insulating cover. Here, a radar measuring device or other radiation-based measuring devices are used to control the inflow of liquified steel and synthetic slag so that the surfaces of the materials are continuously at the same predefined distance from the cover. This method is based on determining the position of the liquified steel and slag with respect to the heat-insulating cover. No measurements are made regarding the properties of the material such as density, width, temperature and homogeneity.

From EP 3 628 416 A1 both a process and an installation for continuous casting of a metallic product are known, comprising a mold, a supporting strand guide adjoining the mold, along which a strand emerging from the mold, in particular vertically downwards, can be transported in the conveying direction. It is of great importance that the strand is already completely hardened or solidified within the supporting strand guide (i.e. within the cooling zone) in order to prevent the liquid metal core from breaking away. In this case, a radar measuring device measures a thickness of the strand at a measuring position located directly at the end of the supporting strand guide (i.e. downstream of the cooling zone). By comparison with a predetermined thickness of the strand by means of a computer unit coupled to the radar measuring device in terms of signal technology, a control signal is generated with which at least one casting parameter can be adjusted according to the measured deviation.

A disadvantage of this method, however, is that the strand has already passed completely through the supporting strand guide at the time of measurement. If changes in the thickness of the strand occur in this area, these affect the supporting strand guide and lead, for example, to increased wear of the support rollers, in particular of support rollers in arc systems due to the increased load in the area of the straightener.

In EP 3 628 416 A1, merely the thickness of the strand is considered as a measured variable. No statements can be made about the quality of the casting process with regard to properties such as width, density, temperature and homogeneity. If defects are found in the strand at this point or in the subsequent process, this will lead to increased scrap.

Task

The present invention is therefore based on the technical task of providing a method for the reliable detection of faults during casting operation, in particular after exit from a mold, which is particularly precise, conserves resources and allows a wide range of options for successive fault correction.

In addition, it is the task of the present invention to dispense with additional sensors as far as possible in order to keep maintenance and servicing costs as low as possible.

The endless strand may, for example, be a web of metal, for example in the form of a metal foil, of paper, of plastic, of an opaque fabric, of a composite material or of a multilayered material.

The web of material is preferably flat in shape in relation to its length and width, and has a long length compared to its width. The dimension of the material web to be determined is then preferably a width.

Preferably, the at least partially fused endless strand is a partially fused metal endless strand (i.e., a web of metal).

A quasi endless strand or quasi-endless strand is a long continuous strand. A quasi-endless strand may well have an end in actual terms, so the quasi-endless strand is only quasi-endless. What is meant is merely that the process is of such a nature, for example, that it permits continuous operation and continuous strand generation. Thus, the quasi-endless strand may actually be finite somewhere or at some point. In one example, an mold from which a quasi-endless strand is generated is empty at one point in time. The quasi-endless strand would now get an end as the process continues, unless the mold would be filled with further material, i.e. refilled, to provide further raw material for a continuously proceeded strand production.

An example of a metal endless strand is slab production, particularly during the continuous casting process.

Depending on the shape of the mold, other cross-sections can also be produced. In the case of square or circular cross-sections, however, the term "slab" is no longer used but rather "billets", in which liquid metal is discharged as a slab from a mold vertically downward in a conveying direction in a continuous casting plant, guided along a strand guide(S) and redirected into the horizontal.

Cooling in the mold is referred to as "primary cooling". Only a thin strand shell is formed in the mold due to the steel cooling and solidification, in particular the thin strand shell is formed only directly after the liquid metal exits the mold. After the formation of this thin strand shell, the strand leaves the mold and is cooled by a supporting strand guide in the cooling zone (K) (also known as the secondary cooling zone), which is adjacent to the mold, until complete hardening (see Verein Deutscher Eisenhüttenleute (VEDh), Stahlfibel, Verlag Stahleisen, Düsseldorf, 2002).

There are vertical and horizontal continuous casting processes. In a vertical process, there are often various zones (bending zone, circular zone, straightening zone) in which the vertical strand passes through a curve so that it is also converted into a horizontal strand at the end of the process.

In a first cooling zone, the slab is often cooled intensively in such a way that a microstructural transformation from austenite to ferrite takes place in the surface-near edge zone of the slab. A basic idea of the invention is to determine the strip edge layer or the bandwidth of metallic strips with two or more radar sensors, preferably high-frequency sensors in the range 30 to 300 GHz of the type FMCW: Frequency Modulated Continuous Wave.

Discussion of the Invention and Possible Embodiments

The present invention is an invention in the technical field of RADAR technology. RADAR means "RAdio Detection And Ranging." Loosely translated, this means approximately "radio-based location and distance measurement".

The invention can be used particularly advantageously in connection with the field of casting technology.

Although the established wording suggests a limitation to radio frequencies, this is not absolutely necessary for the present invention and electromagnetic waves of all other frequencies (including optical) can also be used or other physical wave phenomena such as sound and ultrasound.

In a preceding part, relevant prior art problems in the field of RADAR technology were described.

According to the invention, the problems of the prior art are solved by the method according to claim 1. Preferred embodiments and further embodiments are defined by the subclaims.

Accordingly, a method is provided for contactless determination of at least one property of an at least partially melted quasi-endless strand during a casting process of the quasi-endless strand, which cools in a cooling zone (K), whereby successive hardening of the quasi-endless strand is enabled, comprising at least the following steps: Emitting a first signal, in particular a first RADAR signal, in the form of radiation by an emission device, in particular a RADAR emission device, generating a second signal, in particular a second radar signal, at least partially by interacting (S02*b*) the first signal with a region of the quasi-endless strand, receiving the second signal by a reception device, in particular by a reception device for radar signals, determining at least one property of the quasi-endless strand on the basis of the second signal, characterized in that at least the step of interacting takes place within the cooling zone or upstream of the cooling zone (K), in particular immediately after exit from a mold.

The invention further provides an apparatus. Accordingly, there is provided an apparatus for casting a material, in particular a metal, into a quasi-endless strand in a continuous casting process and for contactless determination of at least one property of the at least partially molten quasi-endless strand during casting of the quasi-endless strand, comprising: a mold suitable for forming the quasi-endless strand, a cooling zone in which the quasi-endless strand cools, whereby a successive hardening of the quasi-endless strand is allowed, an emission device, in particular a radar emitter, which is arranged to emit a first signal in the form of radiation, in particular as a first radar signal, a reception device, in particular a radar receiver, very preferably a radar sensor, which is arranged to receive a second signal, in particular a second radar signal, whereby the second signal is generated at least partially by interaction of the first signal with a region of the quasi-endless strand in the cooling zone or upstream of the cooling zone (K), in particular immediately after exit from a mold, and a data processing unit which is arranged to determine at least one property of the quasi-endless strand on the basis of the second signal.

For example, the emission device and the reception device are configured as sensors. For example, it may be advantageous if the radar sensor and the radar receiver are configured as a single radar sensor (also referred to as a radar transceiver).

The invention further provides a use of an emission device and a reception device. Accordingly, a use of an emission device and a reception device, in particular for radar signals, for contactless determination of at least one property of an at least partially melted quasi-endless strand during a casting process of the quasi-endless strand, which is cooling down in a cooling zone, whereby a successive hardening of the quasi-endless strand is enabled, Wherein the emission device and the reception device are arranged to determine the at least one property of the quasi-endless strand in the cooling zone or upstream of the cooling zone (K), in particular immediately after exit from a mold.

The preferred embodiments and further embodiments of the main claim can likewise be combined-individually or in combination—with the secondary arrangements.

In particular, the invention has the advantage that measurements are already taken within the cooling zone or upstream of the cooling zone (K), in particular immediately after exit from a mold. Since the step of interacting takes place within the cooling zone or upstream of the cooling zone (K), in particular immediately after exit from a mold, the determined at least one property relates to the quasi-endless strand upstream within the cooling zone or upstream of the cooling zone (K), in particular immediately after exit from a mold. This information about the quasi-endless strand in the cooling zone is very valuable because the continuous casting process is not very far advanced at the time of measurement. The measurement is therefore carried out at a very early stage with regard to the ongoing continuous casting process.

In this way, material can be saved. For example, a faulty process can be detected at an early stage and stopped at an early stage, thus saving resources. In another example, a defect detected in this way can be effectively corrected, since the defective material of the quasi-endless strand has not yet been converted to the fully cooled, solid aggregate state. Since the material is still more formable, for example, and any parameters of the cooling process can still be adjusted, there are advantageous correction and further processing options.

Measurement within the cooling zone or upstream of the cooling zone (K), in particular immediately after exit from a mold, is generally more difficult to implement or, respectively, can be less accurate because the physical environment within the cooling zone or upstream of the cooling zone (K), in particular immediately after exit from a mold, interacts with or disturbs the measurement methods. In particular, measurements with electromagnetic waves of the radio spectrum or ranges adjacent to this spectrum have proven to be particularly robust here, so that they provide a particularly robust and resilient method. Despite the fact that radar technology appears at first glance to be less accurate in a laboratory situation than a laser in a laboratory, radar retains its precision in the real atmosphere of a steel mill, in particular also when measurements in the area of the cooling zone or upstream of the cooling zone (K), in particular immediately after exit from a mold are made on the strand, or even when the measuring devices are located within the cooling zone or upstream of the cooling zone (K), in particular immediately after exit from a mold, in which the strand still has a very high temperature.

Moreover, an expert in control engineering will recognize, there are numerous possibilities for combining the invention with suitable control loops.

PREFERRED EMBODIMENTS

According to a further embodiment, the method further comprises a step of handling a defect or an anomaly in the quasi-endless strand, which is determined on the basis of the determined properties or secondary variables determined therefrom, in particular by a termination of the casting process or a generation of a protocol or an instruction, which is suitable for removing the region of the quasi-endless strand affected by the defect subsequently during further processing, further in particular by cutting out the region affected by the defect during a successive division of the quasi-endless strand into slabs.

According to a further embodiment, at least one specific property of the quasi-endless strand is selected from the group consisting of distance, width, thickness, density, temperature and homogeneity. Thus, various technically relevant properties can be determined efficiently and at an early stage. In particular, a distance can be measured. For example, a certain distance is useful for maintaining a target distance, or as input for calculating further quantities such as the width of the quasi-endless strand.

According to a further embodiment, the homogeneity is determined as a property of the quasi-endless strand. In particular, the homogeneity can be determined by determining the surface finish or surface structuring of the quasi-endless strand. During the casting process, the mold vibrates in the vertical direction. This is necessary to prevent the forming strand shell from sticking to the mold walls. However, the vibration of the mold in the vertical direction during the casting process causes changes in the (sub) millimeter range to form on the surface of the quasi-endless strand, especially on its narrow sides. The resulting grooves are referred to by experts as oscillation marks. In a particularly preferred embodiment, the present invention determines the surface roughness on the surface of the quasi-endless strand by means of a roughness measurement and can thus make statements about the oscillation marks which allow conclusions about the homogeneity and thus the quality of the casting process. In a particularly preferred embodiment, the surface roughness is determined by means of a non-contact method. Particularly preferred are measurement methods based on electromagnetic waves, for example radio frequencies, ultrasound, infrared, or optical wavelengths, but especially in the range of radio frequencies (RADAR technology), such as by a radar signal. In a preferred method, the oscillation marks are determined by difference of two distances in the (sub-) millimeter range. For example, the depth of the oscillation marks t is determined as $t=x1-x2$, whereby x1 and x2 denote the determined distances.

According to a further embodiment of the invention, therefore, both the method for contactless determination of at least one property of an at least partially melted quasi-endless strand as well as the device defined herein for casting a material are used to determine the oscillation marks of the quasi-endless strand, in particular on its surface, preferably in the region within the cooling zone or upstream of the cooling zone (K), in particular immediately after exit from a mold.

According to a further embodiment, steps S01 to S03 are carried out from two different locations, in particular from two positions located substantially across from each other with respect to the quasi-endless strand.

According to a further embodiment, a width of the quasi-endless string is determined by subtracting the sum of two certain distances and a distance of the two different positions from each other, or a width of the quasi-endless string is determined by subtracting two certain distances from the distance of the two different positions from each other, in particular when emitting and receiving are performed substantially at a right angle to a surface of the quasi-endless string.

In this way, the width of the strand can be efficiently determined and monitored in order to take any error correction actions. For example, the width b is thus determined as $b=d-x1-x2$, where x1 and x2 denote the two determined distances and d denotes the distance between the two different positions. For example, $b=d-(x1+x2)$ can also be calculated.

The calculation has an advantageous behavior with respect to error propagation.

According to a further embodiment, a width of the quasi-endless strand is determined by subtracting the sum of two certain distances and a distance of the two different positions from each other, or a width of the quasi-endless strand is determined by subtracting two certain distances from the distance of the two different positions from each other, wherein the emitting and receiving are substantially at a right angle to a surface of the quasi-endless strand, further wherein a trigonometric function is used in the determination of at least one of the two distances to correct for the effect of an angular deviation from the right angle measurement. This makes the calculation more accurate.

In one example, a travel distance or travel time is multiplied by a cosine of an angle. For example, this is the angle of incidence or the deviation of the angle of incidence from the right angle. It can also be half the angle between the incident and outgoing signal.

By correctly taking the angle into account, a measurement, in particular made at an angle, becomes more accurate. This makes successive calculations more accurate. For example, an effective averaged total distance of the emitting and reception device from the strand is thus more accurately determined, and thereby the width of the strand can be successively calculated more accurately.

According to a further embodiment, a wall (51, 52, 61, 62) is arranged between the emission device and the quasi-endless strand, whereby the wall (51, 52, 61, 62) having a recess (7) through which signal propagation is enabled. Such a wall (51, 52, 61, 62) provides protection, for example from temperature. The recess enables a measurement. The measurement is particularly focused due to the recess.

According to a further embodiment, the recess is dimensioned in such a way that an effective opening angle for the emission device is formed which is at most 80% of the emission opening angle of the emission device. Thus, the recess results in an effective opening angle that is significantly smaller than the emission opening angle of the emission device. This allows an even better focused and in the result very accurate measurement.

According to a further embodiment, the distance between the emission device and the wall (51, 52, 61, 62) is at least 10 cm. This protects against temperature and is very easy to maintain and clean.

According to a further embodiment, the quasi-endless strand is produced in a continuous casting process. In such a continuous casting process, expensive raw material is processed at high temperature and highest energy expenditure.

The cost savings through the use of the invention are therefore particularly high when the invention is used in a continuous casting process. This is because defects can be detected at an early stage and corrected if necessary. As a result, material, energy, labor and other resources are efficiently saved.

According to the invention, the emission device and/or the reception device is arranged within the cooling zone or upstream of the cooling zone (K), in particular immediately after exit from a mold. Since, according to the invention, measurements are taken on the strand within the cooling zone or upstream of the cooling zone (K), in particular immediately after exit from a mold, the arrangement of the emission device and/or the reception device within the cooling zone or upstream of the cooling zone (K), in particular immediately after exit from a mold, achieves an efficient device setup and a short signal path. This allows the device to operate very precisely.

According to a further development, the emission device and the reception device comprise a shared device, in particular a shared radar transceiver. This saves costs, since only one device is required. In addition, it is particularly easy to measure at right angles on the string. In many RADAR setups, this also means that only a single calibration is required.

According to a further embodiment, a mold is used in the continuous casting process through which the quasi-endless strand is formed, whereby steps S01 to S03 being carried out immediately downstream of the mold.

According to a further embodiment, the emission device and/or the reception device is protected by a cover formed of PTFE, which is stable at least up to a temperature of 260° C., and/or ceramic, which is stable at least up to a temperature of 1,400° C.

The cover efficiently protects the respective device from temperature and other environmental influences.

According to a further embodiment, the emission device and/or the reception device is protected by a first cover, which is in particular designed as a perforated pinhole aperture, and further the hole is covered by a second cover, wherein the second cover is formed of PTFE. This combines good protection with good emission or reception characteristics of the respective device.

According to a further embodiment, the emission device and/or the reception device comprise a lens construction. This serves, for example, to focus the electromagnetic waves and thereby contributes to precise measurement.

According to a further embodiment, the emission device and/or the reception device comprise a horn antenna and/or a phased array antenna. Horn antennas and phased array antennas have particularly suitable radiation characteristics for use in connection with the present invention. In general, various directional antennas may be used in connection with the invention.

In accordance with a further embodiment, the invention is operated in continuous wave mode, in particular frequency modulated and in particular as a continuous wave radar. This is particularly well suited for the intended purpose and is particularly precise. In addition, it enables continuous monitoring.

LIST OF FIGURES

The present invention is explained in more detail below with reference to the embodiments given in the schematic figures. The following are shown.

DESCRIPTION OF FIGURES

Figure 1:
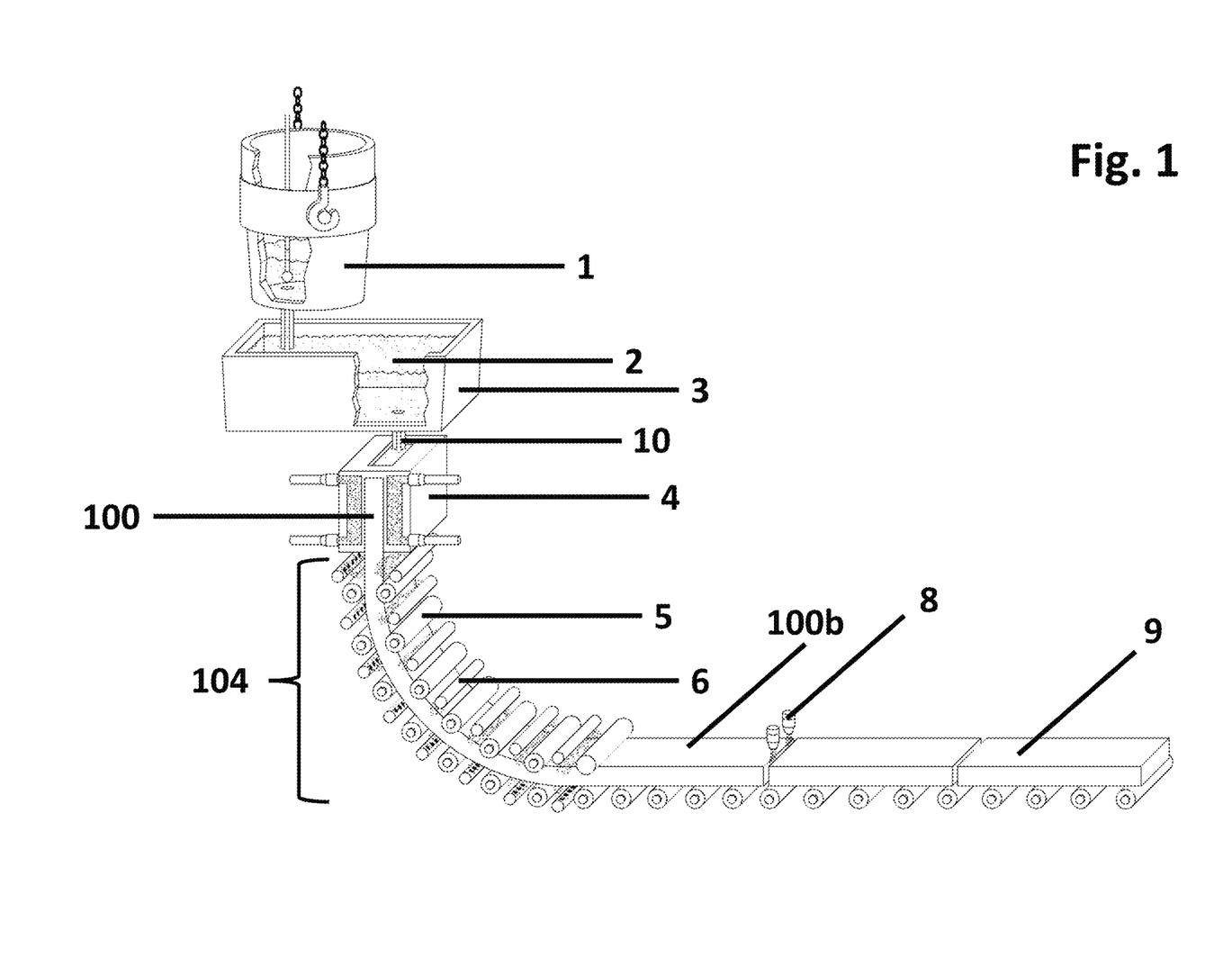
FIG. 1 an apparatus for carrying out a continuous casting process (continuous casting plant)

A continuous casting plant conventionally operates as shown in FIG. 1. The continuous casting plant is filled with liquid steel 2 or a molten metal 2 in a casting mold 4, the mold 4, open at the bottom. Primary cooling takes place in the area of the mold 4. The molten metal, which is still liquid and has a temperature of approx. 1,600° C., flows into a channel, also named mold, where the molten metal is cooled down. Heat is dissipated via the mold walls so that the metal solidifies and forms a load-bearing shell. This means that a crust is formed on the outside during the cooling process. The solidification temperature of steel, for example, is around 1,150° C. to 1,500° C., depending on its composition. The so-called strand shell contains a liquid core. The solidified strand shell is continuously drawn out of the mold and passed on supported by rollers 5. At the primary cooling station, about 12% of the energy of the metal is conventionally extracted by means of a water cooling system in the molds. The mold walls typically consist of coated or uncoated copper plates. The back of the copper plates is cooled by contact with cooling water. The cooling water is pumped through cooling slots or cooling gaps provided for this purpose between the mold wall and the support plates. The flow rate of the cooling water is high and selected to achieve a heating of 6 to 15° C. The heat dissipation of about 2 megawatts per square meter achieved in the mold is high. The energy is dissipated unused via the heat exchanger and cannot be fed to a recovery system in this form. The first station, the mold, is followed by secondary cooling by spray cooling with water or an air-water mixture. In secondary cooling, also secondary cooling zone (K) 104, heat is removed from the strand by spray cooling 6, radiation and closed machine cooling until solidification occurs or the stability of the shell is ensured without cooling. The solidified metal strand is then cut into ingots, known as slabs, blooms, billets, or strand pieces and further processed or stored temporarily. The energy content of these ingots or billet pieces still corresponds to about 50% of the energy content of the liquid metal.

Figure 2:
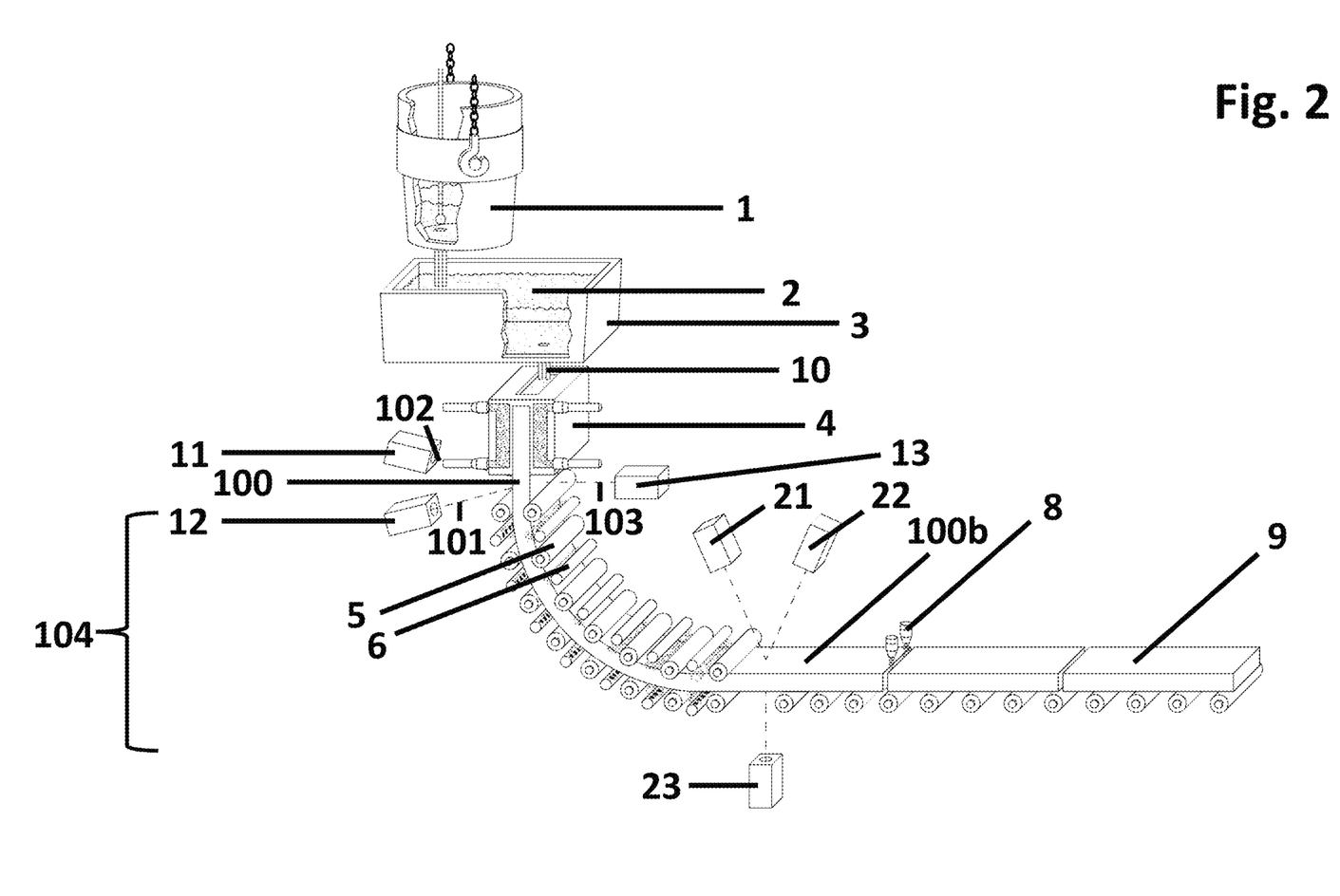
FIG. 2 an apparatus for carrying out a continuous casting process (continuous casting plant), which is provided for the process according to the invention in accordance with one embodiment, which is set up in particular to determine a thickness of a quasi-endless strand.
Figure 3:
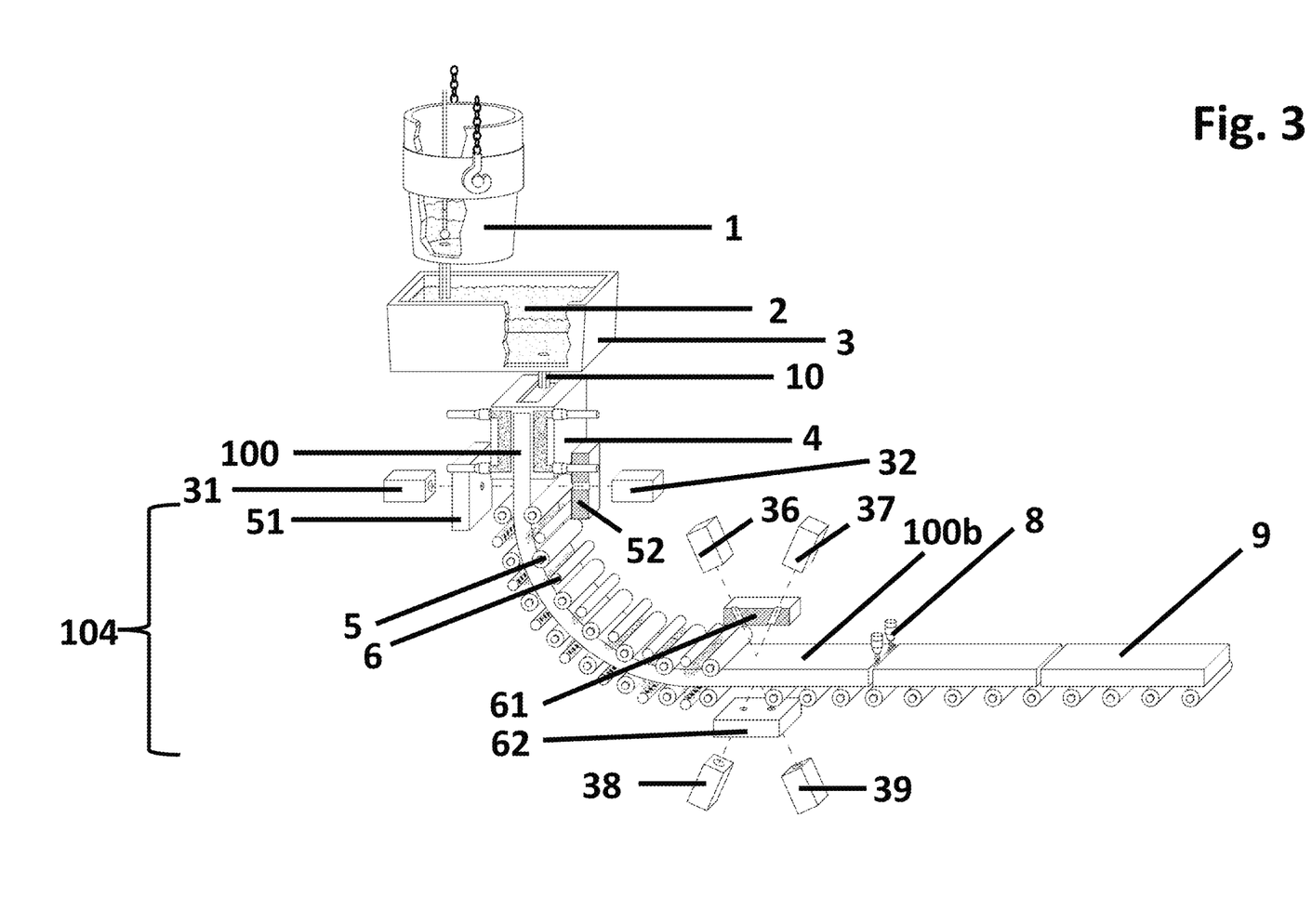
FIG. 3 an apparatus for carrying out a continuous casting process (continuous casting plant), which is provided for the process according to the invention in accordance with one embodiment, which is set up in particular to determine a thickness of a quasi-endless strand.
Figure 4:
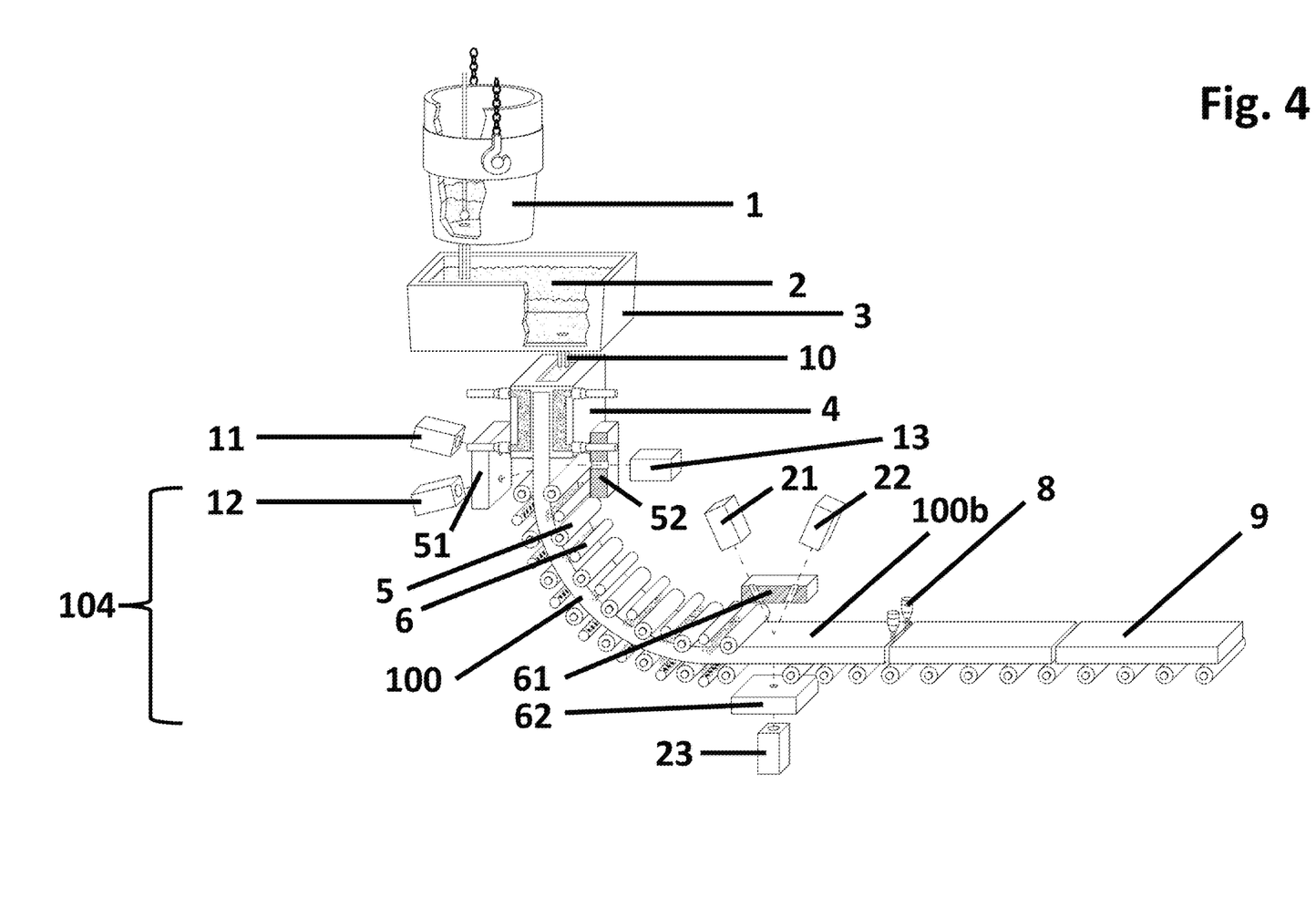
FIG. 4 an apparatus for carrying out a continuous casting process (continuous casting plant), which is provided for the process according to the invention in accordance with one embodiment, which is set up in particular to determine a thickness of a quasi-endless strand.
Figure 5:
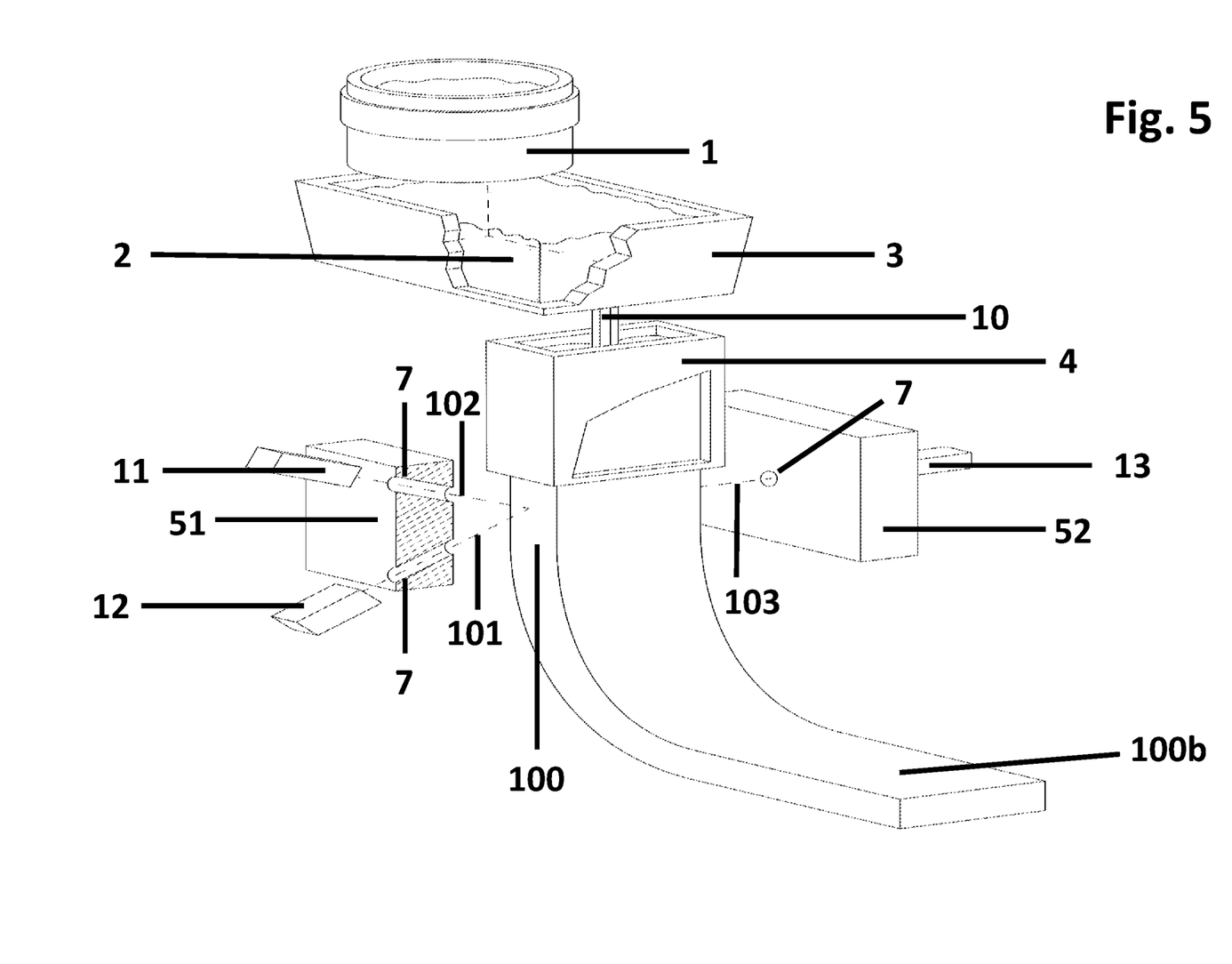
FIG. 5 a simplified schematic representation of an apparatus for carrying out a continuous casting process (continuous casting plant), which is provided for the process according to the invention in accordance with one embodiment, which is set up in particular to determine a width of a quasi-endless strand.

FIGS. 1-5 show continuous casting plants and are described-wherever possible-together. In this regard, the devices of FIGS. 2-5 are arranged to enable the present invention to be put to use. In particular, the devices of FIGS. 2, 3 and 4 are arranged so that the present invention can be put to use to determine a thickness of a quasi-endless strand. In particular, the apparatus of FIG. 5 is arranged to put the present invention to use to determine a width of a quasi-endless strand. For numerous processes, the determination of a width is particularly relevant.

The ladle 1 comprises a molten metal 2, which flows from there into the distributor 3, and from there via the pouring tube 10 successively into the mold 4, thus forming the quasi-endless strand 100.

Shown in all figures is a vertical casting process, but the invention can also be used with other casting processes such as a horizontal casting process.

The generation and successive cooling of the strand are carried out, for example, as described further above. Guiding and successive cooling of the strand are performed here by the rollers/rolls 5 and the cooling devices 6.

The finished quasi-endless strand 100b is for example cut by a cutting device 8, for example such as one or more cutting torches or one or more plasma torches 8 into slabs 9 or billets.

In FIG. 2, the apparatus is practicing the method according to the invention. In particular, a RADAR emission device 11, a RADAR reception device 12 and a RADAR transceiver 13 are shown, which are adapted to be used in a process according to the invention.

In this example, a RADAR emission device 11 and a RADAR reception device 12 separate therefrom are used on the left-hand side. On the right-hand side, the RADAR transceiver 13 comes into use in this example. However, this arrangement is merely an example. Both on the left-hand and on the right-hand side a choice can be made—independently of each other—whether to use a transceiver or separate emission and reception device. All combinatorial choices (1. left: Transceiver, right: Transceiver; 2. left: Transceiver, right: Transmitter+Receiver; 3. left: Transmitter+Receiver, right: Transceiver; 1. left: Transmitter+Receiver, right: Transmitter+Receiver) are compatible with the present invention. For example, two RADAR transceivers 31 and 32 are shown in FIG. 3.

A further, i.e. additional, measurement is also possible on the horizontal strand. For this purpose, a RADAR emission device 21, a RADAR reception device 22 and a RADAR transceiver 23 are shown in FIG. 2. An additional measurement has numerous advantages. For example, it is possible to check on the horizontal strand whether a defect previously detected during an initial measurement on the vertical strand could be eliminated. Also, the material has cooled down much further and the measurement therefore provides measured values that are closer to the measured values of the finished product.

However, this arrangement of a RADAR emission device 21, a RADAR reception device 22 and a RADAR transceiver 23 in FIG. 2 is also merely an example. Both on the upper and lower side a choice can be made-independently of each other-whether a transceiver or separate emission and reception devices are to be put to use. All combinatorial choices (1. above: Transceiver, below: Transceiver; 2. above: Transceiver, bottom: Transmitter+Receiver; 3. above: Transmitter+Receiver, bottom: Transceiver; 1. Top: Transmitter+Receiver, below: Transmitter+Receiver) are possible and also compatible with a combination with the teaching according to the invention. For example, two RADAR emission devices 36 and 38 and two RADAR reception devices 37 and 39 are shown in FIG. 3.

In all figures, the positioning of associated emission devices and reception devices is merely exemplary. For example, in FIG. 2, RADAR emission device 11 may also be located where the RADAR reception device 12 is shown, while likewise the RADAR reception device 12 is located where RADAR emission device 11 is shown.

FIG. 3 further discloses walls or covers 51, 52, 61, 62 having recesses which allow signal transmission. The recesses may also be filled with a suitable material. The advantages of the walls or covers are apparent from the description of the invention and its further embodiments.

The apparatus of FIG. 5 is particularly adapted to enable the present invention to be put to use for determining a width of a quasi-endless strand. This is particularly reflected in the FIG. 5 in the position and orientation of the RADAR emission device 11, the RADAR reception device 12 and the RADAR transceiver 13 (and possibly the walls 51, 52). The orientation of the RADAR signals 101, 102, 103 is also adjusted accordingly. In FIG. 5, these are incident on or emanate from the side of the quasi-endless strand 100.

Also in FIG. 5, the positioning of associated emission devices and reception devices is merely exemplary. For example, in FIG. 5, the RADAR emission device 11 may also be located where the RADAR reception device 12 is shown, while likewise the RADAR reception device 12 is located where RADAR emission device 11 is shown.

In this example of FIG. 5, a RADAR emission device 11 and a RADAR reception device 12 separate therefrom are used on the left-hand side. On the right-hand side, the RADAR transceiver 13 is used in this example. However, this arrangement is merely an example. Both on the left and on the right side a choice can be made-independently of each other-whether to put to use a transceiver or separate emission and reception device. All combinatorial choices (1. left: Transceiver, right: Transceiver; 2. left: Transceiver, right: Transmitter+Receiver; 3. left: Transmitter+Receiver, right: Transceiver; 1. left: Transmitter+Receiver, right: Transmitter+Receiver) are compatible with the present invention. The skilled person will recognize that the terms "left" and "right", which refer to the respective figure, are defined differently here in the context of FIG. 5 than in the context of FIGS. 1-4.

For numerous processes, the determination of a width is particularly relevant. For the sake of clarity, FIG. 5 is shown in simplified form.

LIST OF REFERENCE SIGNS

1 ladle
2 molten metal
3 distributor
4 mold
5 rollers/rolls
6 cooling devices
7 recess
8 cutting devices/torches
9 slab
10 pouring tube
11 RADAR emission device
12 RADAR reception device
13 RADAR transceiver
21 RADAR emission device
22 RADAR reception device
23 RADAR transceiver
31 RADAR transceiver
32 RADAR transceiver
36 RADAR emission device
37 RADAR reception device
38 RADAR emission device
39 RADAR reception device
51 wall/cover
52 wall/cover
61 wall/cover
62 wall/cover
100, 100b quasi-endless strand
101 second RADAR signal (secondary signal)
102 first RADAR Signal (primary signal)
103 first RADAR-Signal (primary signal) and second RADAR signal (secondary signal), spatially overlapping
104 cooling zone (K)

The invention claimed is:

1. A method for contactless determination of at least one property of an at least partially melted quasi-endless strand (100, 100b) during a casting process of the quasi-endless strand (100, 100b), which cools down in a cooling zone (K) (104), after leaving a mold, whereby a successive hardening of the quasi-endless strand (100, 100b) is enabled, comprising at least the following steps:
   emitting (S01) a first signal (102) in the form of radiation by an emission device (11, 13, 31, 32),
   generating (S02a) a second signal (101) at least partly by interaction (S02b) of the first signal (102) with a region of the quasi-endless strand (100, 100b),
   receiving (S03) the second signal (101) by a reception device (12, 13, 31, 32),
   determining (S04) the at least one property of the quasi-endless strand (100, 100b) on the basis of the second signal (101),
characterized in that at least the step of interacting (S02b) is performed within the cooling zone (K) (104) or upstream of the cooling zone (K) (104),
   wherein steps S01 to S03 are carried out from two substantially oppositely arranged positions with respect to the quasi-endless strand, and
   wherein according to step S04, a width of the quasi-endless strand is determined by subtracting the sum of two determined distances and a distance of the two substantially oppositely arranged positions from each other, or wherein, according to step S04, a width of the quasi-endless strand is determined by subtracting two determined distances from the distance of the two substantially oppositely arranged positions from each other.

2. The method according to claim 1, wherein the method further comprises:
a step of handling (S05) a defect or an anomaly in the quasi-endless strand (1), which is detected on the basis of the at least one property determined in step S04 or secondary variables determined therefrom by aborting the casting process or generating a protocol or instruction, which is suitable for removing the region of the quasi-endless strand (9) affected by the defect subsequently during further processing by cutting out the region affected by the defect during successive cutting of the quasi-endless strand into slabs.

3. The method of claim 1, wherein the at least one property of the quasi-endless strand is selected from the group consisting of distance, width, thickness, density, temperature, and homogeneity.

4. The method of claim 1, wherein according to step S04, a width of the quasi-endless strand is determined by subtracting the sum of two determined distances and a distance of the two different positions from each other, or wherein according to step S04, a width of the quasi-endless strand is determined by subtracting two determined distances from the distance of the two different positions from each other, wherein said emitting (S01) and said receiving (S02) are substantially at a right angle to a surface of said quasi-endless strand, wherein, moreover, in determining at least one of the two determined distances, a trigonometric function is employed to correct the effect of an angular deviation from said right angle measurement.

5. The method of claim 1, wherein a wall (51, 52, 61, 62) is arranged between the emission device and the quasi-endless strand, wherein the wall comprises a recess (7) through which signal propagation is enabled.

6. The method of claim 5, wherein the recess is dimensioned to form an effective opening angle for the emission device that is at most 80% of an emission opening angle of the emission device.

7. The method of claim 5, wherein the distance between the emission device and the wall (51, 52, 61, 62) is at least 10 cm.

8. The method of claim 1, wherein the quasi-endless strand is produced in a continuous casting process.

9. The method of claim 8, wherein the emission device and/or the reception device comprise a horn antenna and/or a phased array antenna.

10. The method of claim 1, wherein the emission device and/or the reception device are arranged within the cooling zone or upstream of the cooling zone (K) (104).

11. The method of claim 1, wherein the emission device and the reception device comprise a shared radar transceiver.

* * * * *